United States Patent [19]

Meier

[11] Patent Number: 4,765,669

[45] Date of Patent: Aug. 23, 1988

[54] ADAPTABLE ROBOTIC GRIPPER ASSEMBLY

[75] Inventor: Raymond C. Meier, Canton, Mich.

[73] Assignee: Ford Motor Company, Dearborn, Mich.

[21] Appl. No.: 57,198

[22] Filed: Jun. 3, 1987

[51] Int. Cl.$^4$ .............. B25J 15/00; A61P 1/06; B66C 1/42

[52] U.S. Cl. .................. 294/119.1; 294/86.4; 294/106

[58] Field of Search ......... 294/119.1, 86.4, 88, 294/93, 97, 95, 106, 115, 116; 414/789, 753, 5, 6, 730; 901/31, 32, 33, 34, 36, 37, 38, 39, 40, 49; 269/224, 285; 279/110

[56] References Cited

U.S. PATENT DOCUMENTS 4,529,237 7/1985 Gupta et al. .................. 294/106
4,598,942 7/1986 Shum et al. .................. 294/86.4

FOREIGN PATENT DOCUMENTS 53-18165 2/1978 Japan .................. 294/119.1
1181864 1/1984 U.S.S.R. .................. 294/119.1
3741008 9/1985 U.S.S.R. .

Primary Examiner—James B. Marbert
Attorney, Agent, or Firm—Allan J. Lippa; Peter Abolins

[57] ABSTRACT

A robotic gripper assembly having a pair of gripping fingers inserted through a slotted disk, each of which is coupled to a cam groove formed within a cam disk wherein longitudinal finger movement is effectuated along the slotted disk. The closing rate and resolution of the finger movement with respect to cam disk movement are easily changed by interchanging the cam disk. In another embodiment, a three finger configuration is provided wherein the gripping fingers move longitudinally through intersecting planes for handling irregularly shaped objects.

13 Claims, 4 Drawing Sheets

ANGULAR ROTATION
OF DISC 14b IN
DEGREES

ANGULAR ROTATION
OF DISC 14c IN
DEGREES

ADAPTABLE ROBOTIC GRIPPER ASSEMBLY

BACKGROUND OF THE INVENTION

The invention relates generally to robotic gripper assemblies.

Robotic gripper assemblies are known having finger pairs coupled to rotatable gears for moving the fingers toward and away from each other (see, for example, U.S. Pat. No. 4,598,942). The rotatable movement of the fingers, however, may not be suitable for a wide variety of objects having different shapes.

Other known robotic grippers have two fingers which linearly move in a single plane as disclosed in U.S. Pat. No. 4,529,237 and Japanese Pat. No. 53-18165.

A problem with present robotic grippers is that the two finger design is not suitable for handling a wide variety of irregularly-shaped objects. An additional problem is that the closure rate and resolution of the fingers are fixed. Accordingly, present robot gripper assemblies limit the flexibility of robotic systems.

SUMMARY OF THE INVENTION

It is an object of the invention to provide a robotic gripper assembly capable of handling a wider variety of objects than heretofore possible.

In one aspect of the invention, the problems described hereinabove are solved by an apparatus for mechanically gripping an object comprising: a slotted disk having a slot formed through a portion of the diameter of the slotted disk; a a pair of fingers positioned through the slotted disk in a plane perpendicular to the plane of the slotted disk ; a cam disk positioned parallel to and adjacent the plane of the slotted disk; cam means formed in the cam disk comprising a pair of grooves, each of the grooves being operably coupled to one of the fingers; and means for rotating the cam disk to slide the fingers longitudinally along the slot. The closing velocity of the gripper fingers and the resolution of their movement is easily changed by substitution of the cam disk. An advantage is thereby obtained of easily changing the characteristics of the finger movement without replacing the entire assembly.

In another aspect of the invention, the gripping apparatus comprises: a slotted disk having at least three radial slots formed through the slotted disk, each of the radial slots being symmetrically positioned within the slotted disk; a plurality of gripping fingers, each one of the fingers being positioned through each one of the radial slots in a plane which is both perpendicular to the plane of the slotted disk and in a direction parallel to the direction of the respective radial slot; a cam disk movably coupled to the slotted disk in a plane both parallel to and adjacent the plane of the slotted disk; cam means formed in the cam disk comprising a plurality of separate grooves, each one of the grooves being operably coupled to each one of the gripping fingers; and means for rotating the cam disk within the housing to slide each one of the gripping fingers longitudinally along each one of the radial slots. Accordingly, the movement of the gripping fingers is through multiple intersecting planes. An advantage is thereby obtained in handling irregularly shaped objects. Further, the gripper assembly may incorporate any number of gripping fingers desired by a simple substitution of the cam disk and slotted disk. An additional advantage in flexibility is thereby obtained.

DESCRIPTION OF THE PREFERRED EMBODIMENT

Figure 1:
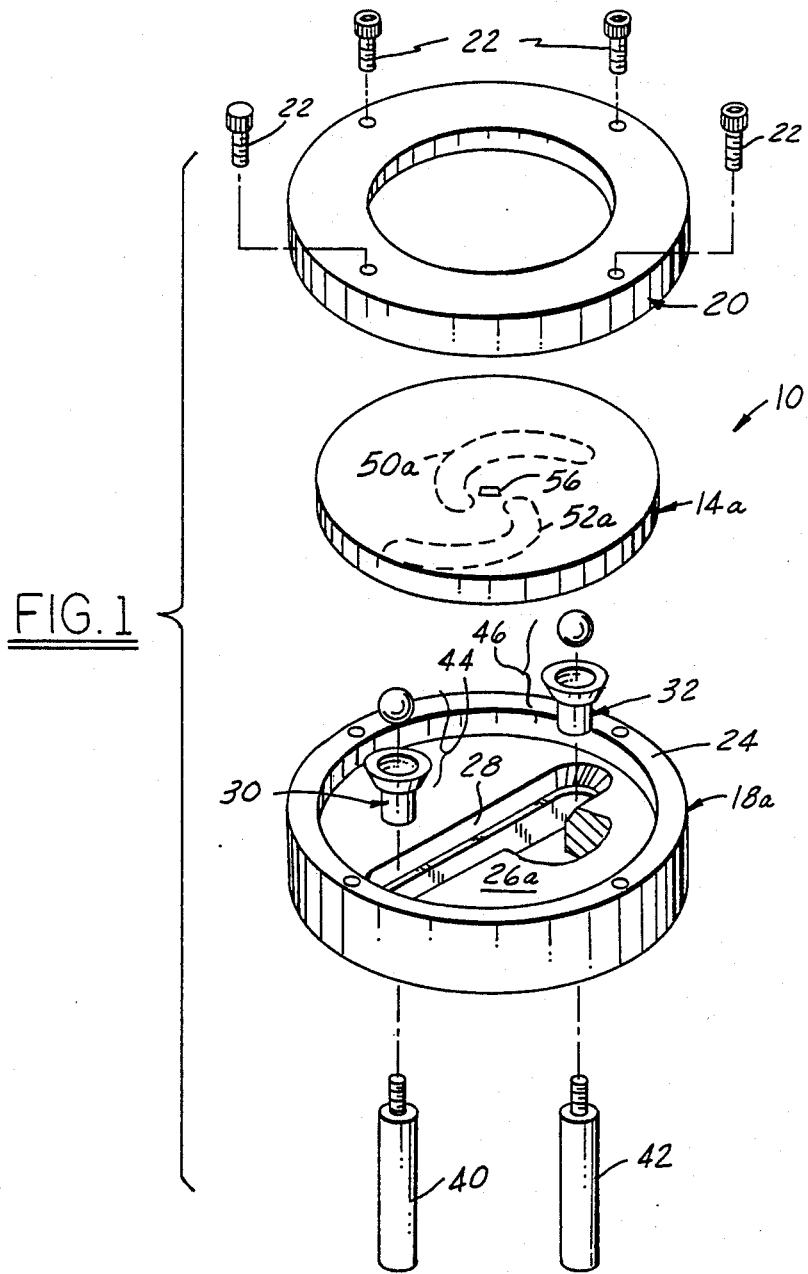
FIG. 1 is a perspective exploded view of a mechanical gripper assembly.

Referring first to FIG. 1, an embodiment of mechanical gripper assembly 10 is shown wherein the invention may be used to advantage. Gripper assembly 10 includes a rotatable cam disk 14a positioned in slotted disk assembly 18a and held in place by plate 20 and machine screws 22. Slotted disk assembly 18a is shown as an integrally-formed housing 24 and slotted disk 26a having slot 28 formed through a portion of the diameter of slotted disk 26a. Although housing 24 and slotted disk 26a are shown integrally formed, they may also be formed as two separate pieces coupled together by conventional means. In any event, the construction is such that cam disk 14a and slotted disk 26a may be easily interchanged.

Finger receptacle 30 and finger receptacle 32 are each shown slidably positioned in slot 28. Gripping fingers 40 and 42 are attached to respective finger receptacles 30 and 32 by conventional means such as, for example, thread screws. The top portion of finger receptacles 30 and 32 are shown having conventional ball bearing assemblies 44 and 46, respectively, for operably coupling with respective cam grooves 50a and 52a formed in the bottom of cam disk 14a.

Figure 2:
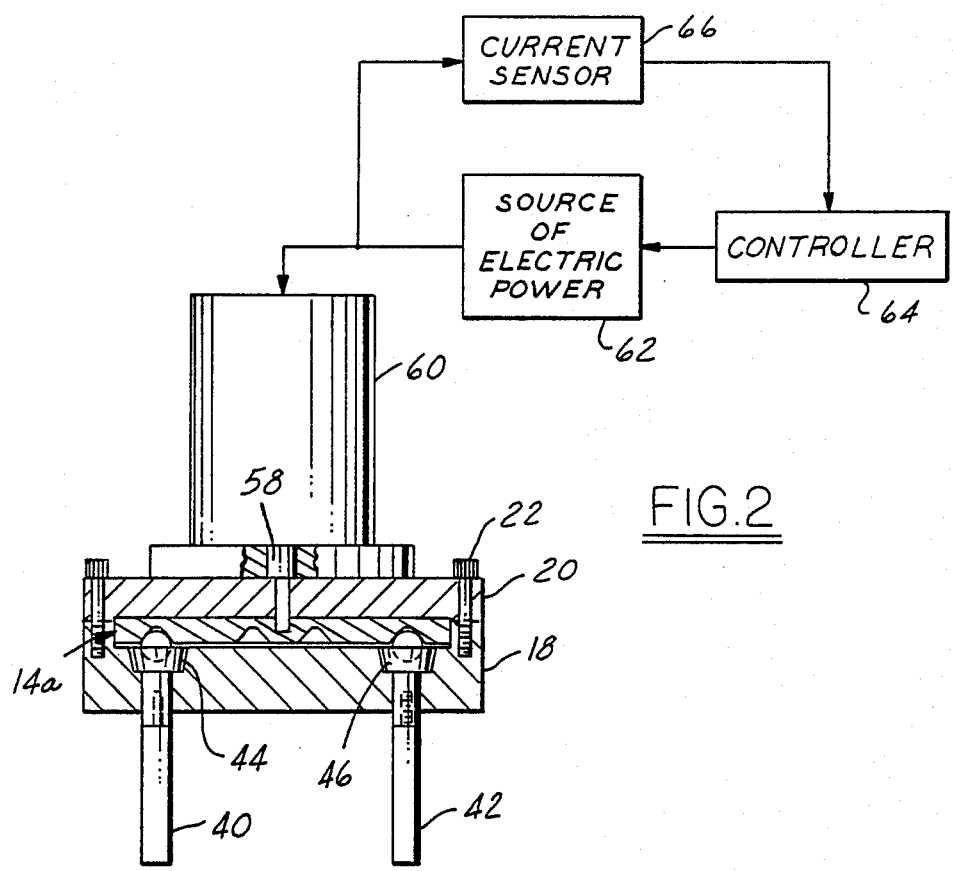
FIG. 2 is a partially broken-away side elevation view of the mechanical gripper assembly with associated electronic circuitry.

Continuing with FIG. 1, and also referring to FIG. 2, shaft receptacle 56 is shown directly coupled to shaft 58 of stepper motor 60. Source of electric power 62 provides electric power to motor 60 upon actuation by controller 64. As explained in greater detail hereinafter, the rotational movement of cam disk 14a in response to actuation of motor 60 causes linear movement of finger receptacles 30 and 32 for exerting a gripping force on an object. An indication that the object has been securely grasped is provided by current sensor 66. In response, the electric power supplied to motor 60 is regulated in a conventional manner by controller 64 to provide a predetermined gripping force.

Figure 3A:
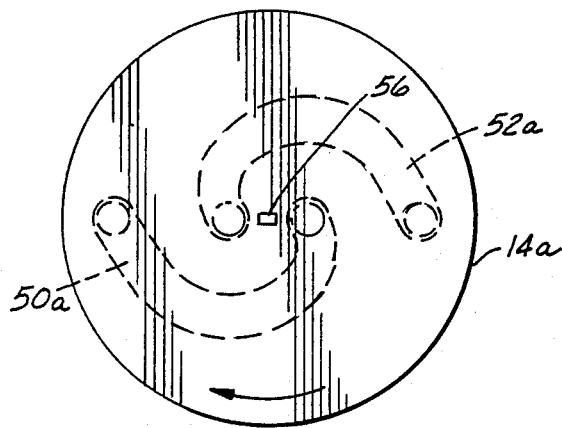
FIG. 3A is a top planar view of one cam disk which may be used to advantage in the mechanical gripper assembly.

Referring now to FIG. 3A, cam groove 50a is constructed such that its opposing ends are separated by 180° with respect to the center of cam disk 18a. Cam groove 52a is similarly constructed. Accordingly, as cam disk 14a is rotated 180° in the clockwise direction by motor 60, the forces caused by the movement of cam grooves 50a and 50b in cooperation with slot 28 will slide finger receptacles 30 and 32 longitudinally along slot 28 from the fully-open to the fully-closed position. Similarly, counter-clockwise movement of cam disk 14a causes longitudinal movement of finger receptacles 30 and 32 towards the fully open position. The longitudinal movement occurs in a plane which is parallel to the longitudinal direction of slot 28 and perpendicular to the plane of slotted disk 18a.

Figure 3B:
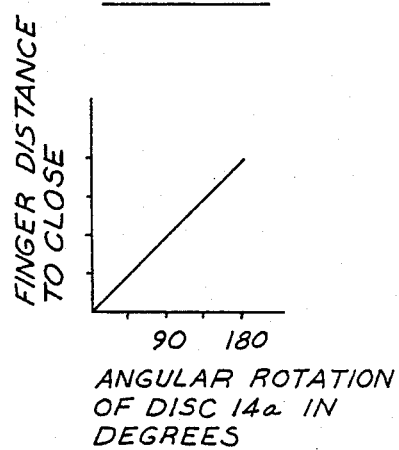
FIG. 3B is a graphical representation of the relationship between cam disk rotation and finger movement for the cam disk shown in FIG. 3A.

For the embodiment of cam disk 14a shown in FIGS. 1 and 3A, cam grooves 50a and 52a are designed with a predetermined curvature to provide a linear relationship between the angular rotation of cam disk 14a and the longitudinal movement of finger receptacles 30 and 32. More specifically, a one-quarter movement (45°) of the maximum angular rotation of cam disk 14a (180°) will move finger receptacles 30 and 32 one-quarter of the way towards either their fully open or their fully closed position. This linear relationship is graphically illustrated in FIG. 3B.

Figure 4A:
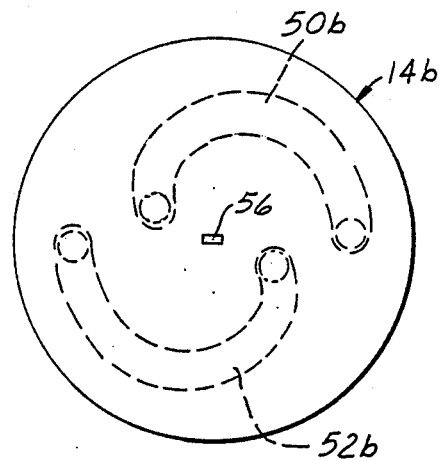
FIG. 4A is a top planar view of another cam disk which may be used to advantage in the mechanical gripper assembly.
Figure 4B:
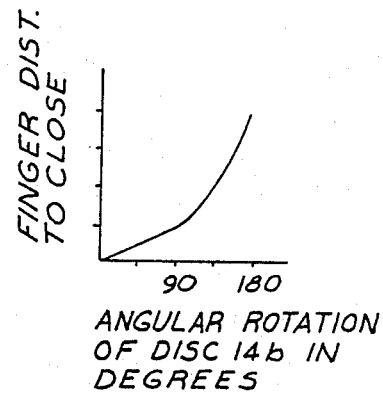
FIG. 4B is a graphical representation of the relationship between cam disk rotation and finger movement for the cam disk shown in FIG. 4A.

Cam grooves 50a and 52a may also be machined with a curvature calculated to provide other desired relationships between the angular movement of cam disk 14a and the corresponding movement of finger receptacles 30 and 32. As an illustrated example, FIG. 4A and FIG. 4B show a cam disk 14b having cam grooves 50b and 52b with a curvature calculated to provide a closing rate or closing velocity which increases or accelerates as the fingers move towards the open position.

Figure 5A:
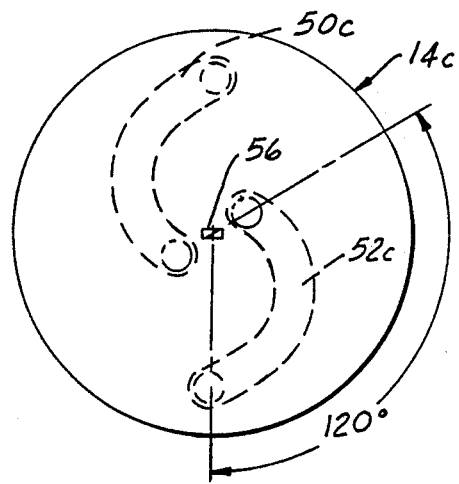
FIG. 5A is a top planar view of still another cam disk which may be used to advantage in the mechanical gripper assembly.
Figure 5B:
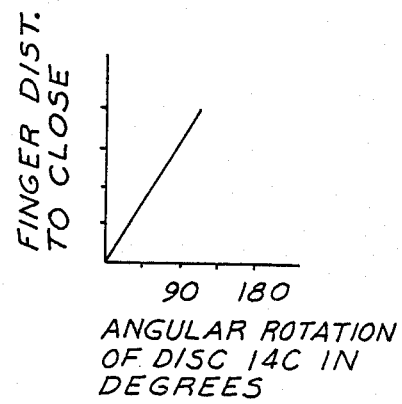
FIG. 5B is a graphical representation of the relationship between cam disk rotation and finger movement for the cam disk shown in FIG. 5A.

Another illustrative example is presented in FIG. 5A and FIG. 5B which show a cam disk 14c having cam grooves 50c and 52c constructed such that a 120° rotation of cam disk 14c moves finger receptacles 30 and 32 between fully-opened and fully-closed positions. For this embodiment, the resolution of gripper assembly 10 is approximately one-third less than the embodiment illustrated in FIG. 3A and FIG. 3B.

Figure 6:
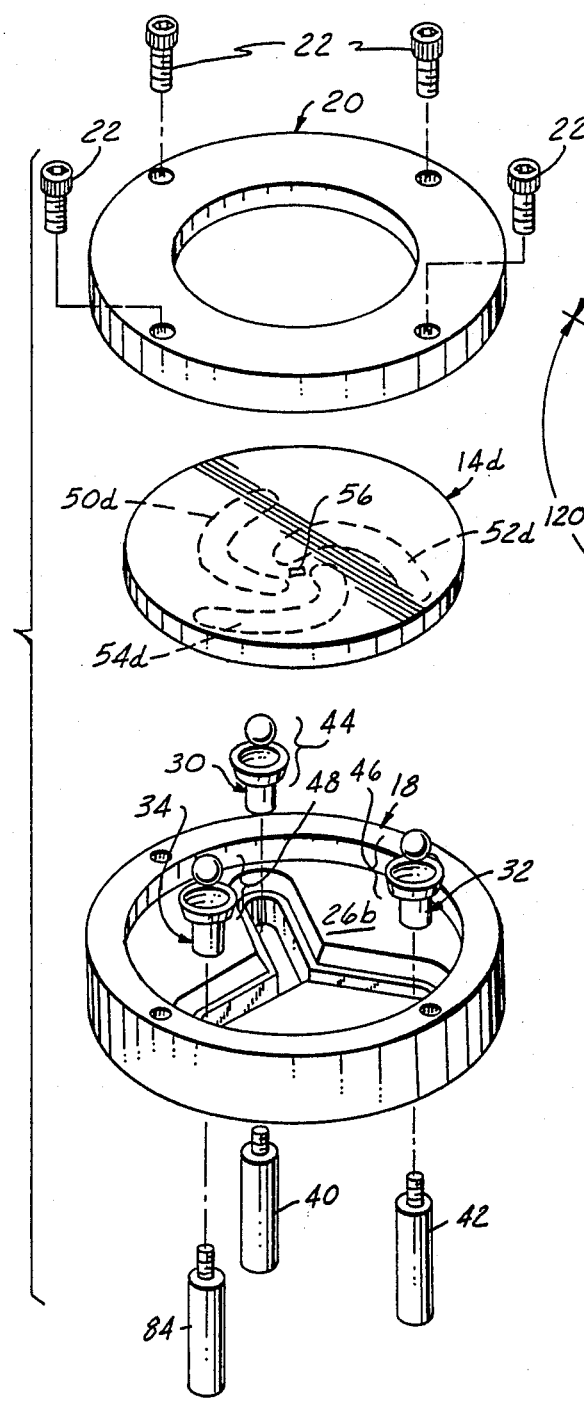
FIG. 6 is a perspective, exploded view of another mechanical gripper assembly illustrating the use of three gripping fingers.
Figure 7A:
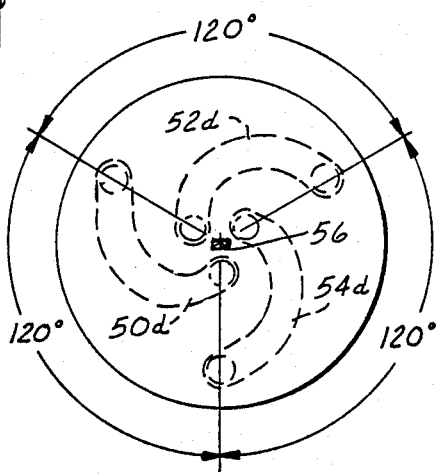
FIG. 7A is a top planar view of the cam disk illustrated in FIG. 6.
Figure 7B:
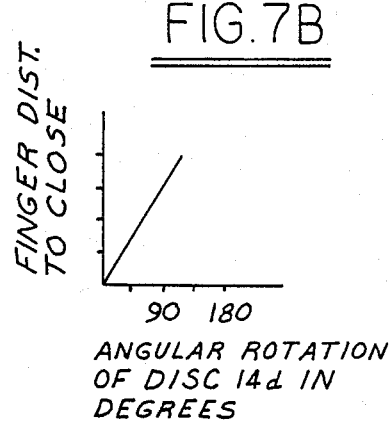
FIG. 7B is a graphical representation of the relationship between cam disk rotation and finger movement for the cam disk shown in FIG. 7A.

Referring now to FIGS. 6, 7A and 7B, cam disk 14d and slotted disk 26b are shown constructed to provide a three-finger gripper assembly. More specifically, cam disk 14d is shown having three symmetrically positioned cam grooves 50d, 52d, and 54d. Slotted disk 26b, positioned parallel to cam disk 14d, is shown having three radial slots 70, 72 and 74 separated by 120°. Shown positioned through the radial slots 70, 72 and 74 for coupling to respective cam grooves 50d, 52d and 54d, are respective finger receptacles 30, 32 and 34. Gripper fingers 40, 42 and 84 are shown for coupling to respective finger receptacles 30, 32 and 34.

In operation, rotational movement of cam disk 14d effectuates longitudinal movement of finger receptacles 30, 32 and 34 along respective slots 70, 72 and 74. In this unique configuration, each of the gripper fingers moves through a separate and intersecting plane. More specifically, each plane is perpendicular to the plane of slotted disk 26b and parallel to the longitudinal direction of the respective radial slot. The multiple plane movement of the fingers enables the handling of a large variety of irregularly-shaped objects.

From the foregoing, it is readily apparent that by a simple substitution of the cam disk, the closing velocity and resolution of the gripping fingers may be quickly changed. Further, by a simple substitution of the cam disk and the slotted disk, the gripper assembly may incorporate any number of gripping fingers desired. For embodiments having more than two gripping fingers, the movement of the gripping fingers is through multiple intersecting planes. Greater flexibility in handling irregularly-shaped objects is therefore obtained. Thus, the mechanical gripper assembly described hereinabove greatly improves the flexibility of any robotic system.

This concludes the description of the preferred embodiment. The reading of it by those skilled in the art will bring to mind many modifications and alterations without departing from the spirit and scope of the invention. Accordingly, it is intended that the scope of the invention be limited only by the following claims.

I claim:

1. An apparatus for mechanically gripping an object, comprising:
   a slotted disk having a slot formed along a portion of the diameter of said slotted disk;
   a pair of finger receptacles positioned through said slotted disk in a plane perpendicular to the plane of said slotted disk;
   a cam disk positioned in a plane both parallel to and adjacent said plane of said slotted disk;
   cam means formed in said cam disk comprising a pair of grooves, each of said grooves being operably coupled to one of said finger receptacles; and
   means for rotating said cam disk to slide said finger receptacles longitudinally along said slot through a plane perpendicular to said slotted disk.

2. The apparatus recited in claim 1, further comprising:
   a housing for housing both said slotted disk and said cam disk; and
   means for removably coupling both said cam disk and said slotted disk to said housing.

3. The apparatus recited i claim 1, wherein said rotating means comprises a stepper motor coupled to said cam disk.

4. The apparatus recited in claim 3 further comprising:
   a source of electric power coupled to said stepper motor;
   means for sensing said electric power drawn by said stepper motor; and
   means responsive to said sensing means and coupled to said source of electric power for regulating said electric power.

5. The apparatus recited in claim 1, wherein the opposing ends of each of said grooves are separated by 180° with respect to the center of said cam disk.

6. The apparatus recited in claim 1, wherein the opposing ends of each of said grooves are separated by 120° with respect to the center of said cam disk.

7. The apparatus recited in claim 1, further comprising a pair of mechanical fingers, each of said mechanical fingers being connected to each of said finger receptacles.

8. An apparatus for mechanically gripping an object, comprising:
   a slotted disk having at least two radial slots formed along radii of said slotted disk;

a plurality of gripping fingers, each one of said fingers being coupled through an associated one of said radial slots in a separate plane which is both perpendicular to the plane of said slotted disk and parallel to the longitudinal direction of said associated radial slot;

a cam disk positioned in a plane both parallel to and above said plane of said slotted disk;

cam means formed in said cam disk comprising a plurality of separate grooves, each one of said grooves being operably coupled to each one of said gripping fingers; and means for rotating said cam disk within said housing to slide each one of said gripping fingers longitudinally along said associated radial slot.

9. An apparatus for mechanically gripping an object, comprising:

a slotted disk having at least three radial slots formed through said slotted disk, each of said radial slots being symmetrically positioned within said slotted disk;

a plurality of gripping fingers, each one of said fingers being coupled through an associated one of said radial slots in a separate plane which is both perpendicular to the plane of said slotted disk and parallel to the longitudinal direction of said associated radial slot;

a cam disk positioned in a plane both parallel to and above said plane of said slotted disk;

cam means formed in said cam disk comprising a plurality of separate grooves, each one of said grooves being operably coupled to each one of said gripping fingers; and means for rotating said cam disk within said housing to slide each one of said gripping fingers longitudinally along said associated radial slot through separate intersecting planes.

10. The apparatus recited in claim 9, further comprising:

a housing for housing both said slotted disk and said cam disk; and means for removably coupling both said slotted disk and said cam disk to said housing.

11. The apparatus recited in claim 9, wherein the opposing ends of each of said grooves are separated by 120° with respect to the center of said cam disk.

12. The apparatus recited in claim 9, wherein said rotating means comprises a stepper motor coupled to said cam disk.

13. The apparatus recited in claim 12 further comprising:

a source of electric power coupled to said stepper motor;

means for sensing said electric power drawn by said stepper motor; and means responsive to said sensing means and coupled to said electric power source for regulating said electric power.

* * * * *